US000001974H

(19) United States

(12) Statutory Invention Registration (10) Reg. No.: US H1974 H

Lee et al. (43) Published: Jul. 3, 2001

(54) WOVEN LOOP PRESS BASE FABRIC HAVING HIGH DENSITY TOP LAYER

(75) Inventors: Henry J. Lee, Summerville; Billy Summer, Joanna, both of SC (US)

(73) Assignee: AstenJohnson, Inc., Charleston, SC (US)

(21) Appl. No.: 09/132,150

(22) Filed: Aug. 11, 1998

(51) Int. Cl.[7] ..... D03D 15/00; D03D 13/00; D03D 23/00; B32B 5/26; D03C 13/00

(52) U.S. Cl. ..... 442/206; 442/181; 442/203; 442/208; 442/268; 34/116; 34/123; 162/358; 139/20; 139/383; 139/408; 139/425

(58) Field of Search ..... 139/383, 20, 408, 139/425; 34/116, 123; 162/358; 442/181, 268, 203, 206, 208

(56) References Cited

U.S. PATENT DOCUMENTS

| | | | | |
|---|---|---|---|---|
| 3,815,645 | | 6/1974 | Codorniu | 139/383 A |
| 4,182,381 | | 1/1980 | Gisbourne | 139/383 A |
| 4,775,446 | * | 10/1988 | Eschmann | 162/348 |
| 4,813,156 | | 3/1989 | Ashworth et al. | 34/116 |
| 4,824,525 | * | 4/1989 | Penven | 162/358 |
| 5,913,339 | * | 6/1999 | Lee | 139/383 |

FOREIGN PATENT DOCUMENTS

| | | | |
|---|---|---|---|
| 0262467 | * | 4/1988 | (EP) . |
| 9211412 | * | 7/1992 | (WO) . |
| 9927181 | * | 6/1999 | (WO) . |

* cited by examiner

*Primary Examiner*—Charles T. Jordan
*Assistant Examiner*—Aileen J. Baker
(74) *Attorney, Agent, or Firm*—Volpe and Koenig, P.C.

(57) ABSTRACT

A papermaker's fabric having a system of primary machine direction yarns which form seaming loops at each end of the fabric and a system of secondary machine direction yarns. A system of cross-machine direction yarns are interwoven with the primary and secondary systems of machine direction yarns in a weave pattern that provides adjacent balancing yarns that maintain the seam loops in substantially vertical alignment.

12 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WOVEN LOOP PRESS BASE FABRIC HAVING HIGH DENSITY TOP LAYER

BACKGROUND OF INVENTION

1. Field of the Invention

The present invention generally relates to a woven fabric for use in a paper, cellulose or board manufacturing machine that is seamed by interlocking loops along each of two fabric edges to form an endless woven fabric.

2. Description of the Prior Art

As will be known to those skilled in the art, papermaking machines generally include three sections which are referred to as the forming, press and dryer sections. A felt is generally employed to transport the formed, wet sheet through the press and dryer sections of the papermaking equipment. The felt must be particularly adapted to specific conditions encountered in papermaking.

Typically, such felts include a supporting base, such as a woven fabric, and a paper carrying or supporting layer fixed to the base. The paper carrying or supporting layer is generally softer and smoother than the base layer. The support layer is often a non-woven batt material which has been affixed to the base and has homogeneous characteristics as to permeability, compaction and drainage. Slight irregularities or imperfections in the support layer are undesirable in virtually all papermaking operations. Inconsistencies in the felt thickness, gauge or weight can cause undesirable vibrations during operation of the equipment.

In press fabrics, the batt material is often anchored to a base fabric which is provided with end loops to join the fabric. Many of these fabrics are woven as endless loops in patterns that provide the seaming loops at each end of the fabric. Standard woven loop base constructions frequently include two layers of weft yarns in a low density, symmetrical construction. However, these base fabrics typically provide limited batt anchorage and sheet support due to low surface contact area. This necessitates the use of a third, topical laminate structure, having a higher density of weft or warp yarns. The laminate is generally bound to the primary base by means of filament entanglement during a post weaving needling process. This process can be costly and time consuming.

Another problem associated with endlessly woven seamed fabrics is seaming of the fabric. Standard endlessly woven loop seam products are made with stacked weft pairs, formed by looping around a forming monofilament. A common problem associated with this type of loop formation is non-uniform loop alignment, both in the vertical and horizontal axis, when the forming wire is removed. This misalignment creates a seam that is difficult to mesh.

FIGS. 1–3 show representative loop misalignments experienced in common prior art endlessly woven seams. Generally, as a loom weaves the loops in an endless weave construction, it naturally offsets the returning weft position slightly from its outgoing weft position. It is possible to maintain the weft yarns in a stacked relationship throughout the fabric through the balanced weave of the warp yarns. However, the last warp yarn 2 does not have a balancing yarn on one of its sides and, therefore, an unbalanced crimp force is applied to the weft yarns in the loop area, as shown by the arrows in FIG. 2. As a result, the two weft yarn passes which form each loop are not balanced by warps and the loops tend to be misaligned.

A similar misalignment of the loops occurs in flat woven fabrics wherein the tie back portion of the warp yarn is offset from the outgoing portion of the warp yarn during loop formation.

The present invention combines two high density structures during the weaving process, with the primary base construction being used to form endless type seam loops. This is achieved by means of unique weave patterns that stitch in a higher density weft layer of yarns to provide greater batt anchorage and maintain a stacked weft arrangement in the base for uniform, vertically aligned, loop formation.

SUMMARY OF THE INVENTION

The present invention generally relates to a papermaker's fabric of a type having a system of primary machine direction yarns which form seaming loops at each end of the fabric. The fabric also includes a system of secondary machine direction yarns and a system of cross-machine direction yarns. The cross-machine direction yarns are interwoven with the primary and secondary systems of machine direction yarns in a weave pattern that provides adjacent balancing yarns that maintain the seam loops in substantially vertical alignment. A method of forming the papermaker's fabric is also provided.

DESCRIPTION OF THE PREFERRED EMBODIMENT

Figure 1:
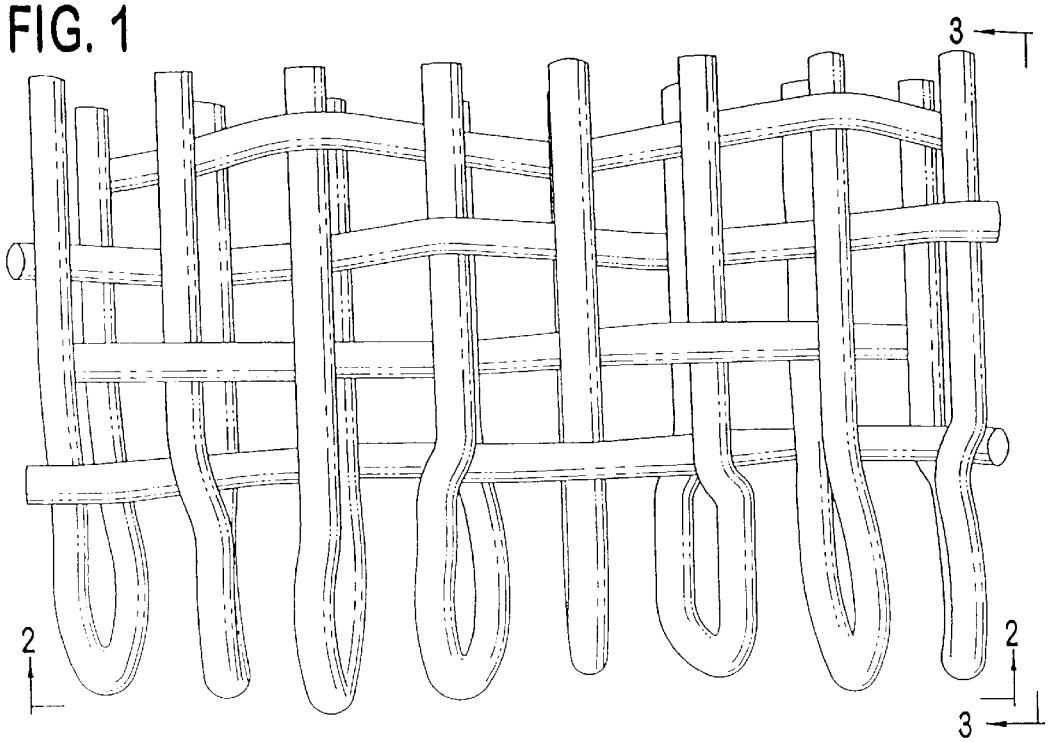
FIG. 1 is a top plan view of prior art end loops.
Figure 2:
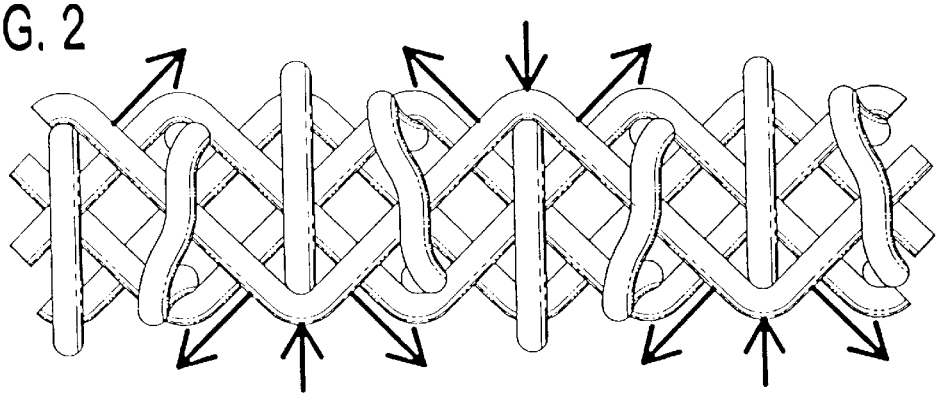
FIG. 2 is an elevation view of the prior art end loops along the line 2—2 in FIG. 1.
Figure 3:
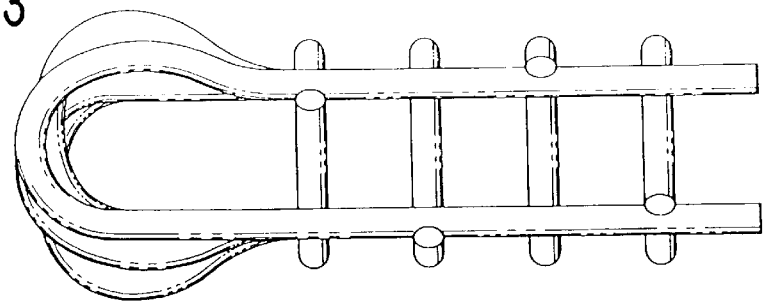
FIG. 3 is a side elevation view of the prior art end loops along the line 3—3 in FIG. 1.

The preferred embodiment will be described with reference to the drawing figures wherein like numerals represent like elements throughout.

Figure 4:
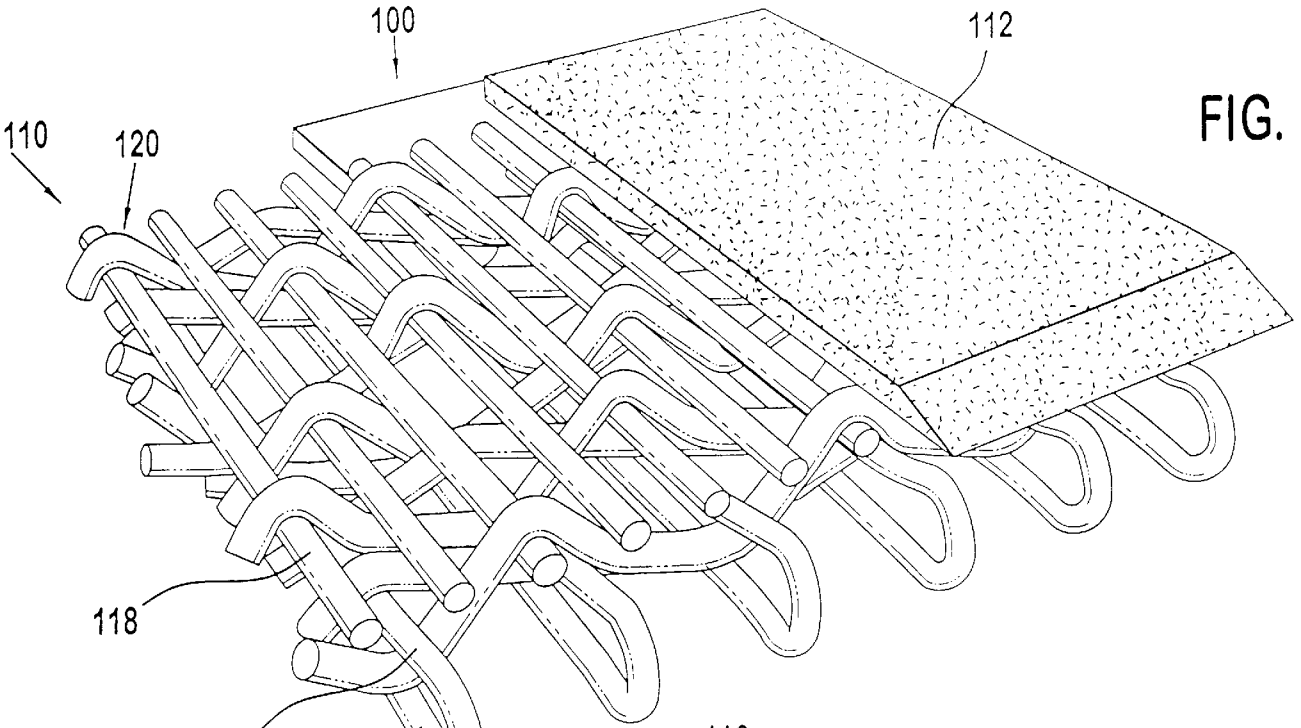
FIG. 4 is a schematic perspective view of a portion of the fabric according to the present invention.
Figure 5:
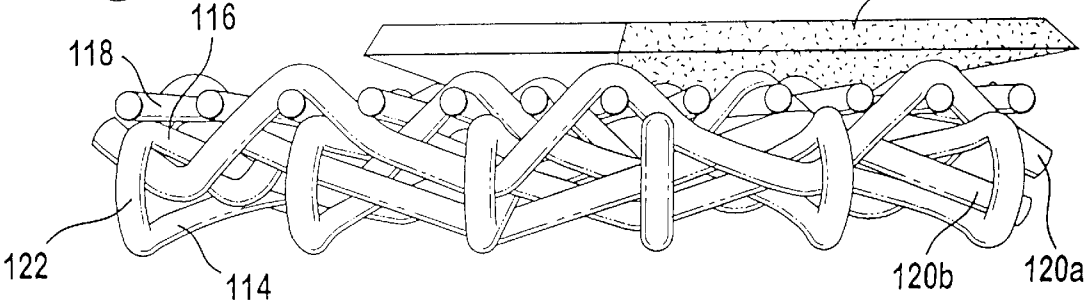
FIG. 5 is an end elevation view of a portion of the fabric according to the present invention.

Referring to FIGS. 4 and 5 the preferred fabric 100 generally comprises a base fabric 110 with batt material 112 attached thereto. The base fabric 110 comprises three layers of machine direction (MD) yarns 114, 116 and 118 interwoven with a system of cross-machine direction (CMD) yarns 120. MD layers 114 and 116 are woven in stacked pairs and form seam loops 122 at each end of the base fabric 110. The third layer MD yarns 118 extend above MD layers 114 and 116 and are substantially parallel thereto. In the preferred embodiment, two third layer MD yarns 118 are provided for every pair of stacked MD yarns 114 and 116.

Figure 6:
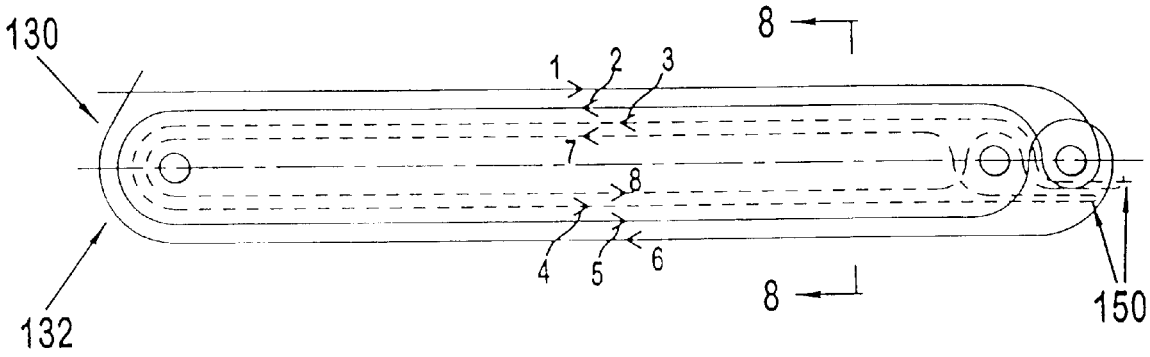
FIG. 6 is a schematic view showing the weaving progression of the weft yarns.
Figure 7:
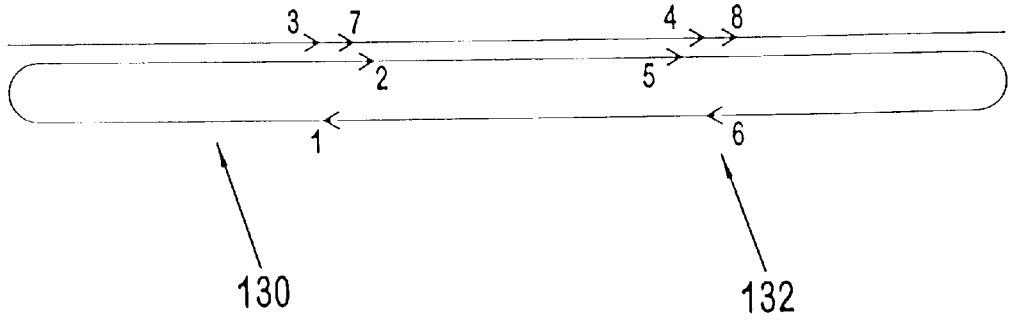
FIG. 7 shows a position of the weft yarn after the fabric of FIG. 6 is removed from the loom and opened.

The fabric 110 is preferably endless woven using a two shuttle loom. The first shuttle weaves the lower and intermediate MD layers 114 and 116 and the second shuttle weaves the upper MD layer 118. As shown in FIG. 6, the base fabric 110 is woven on the loom doubled over upon itself. That is, the base fabric 110 is woven with an upper weaving layer 130 and a lower weaving layer 132 which are opened after weaving as shown in FIG. 7 to provide a base fabric 110 which is approximately twice the length of the fabric on the loom. Reference to position of the yarns relative to one another is the relative position after the fabric is opened, unless otherwise specified.

Figure 8:
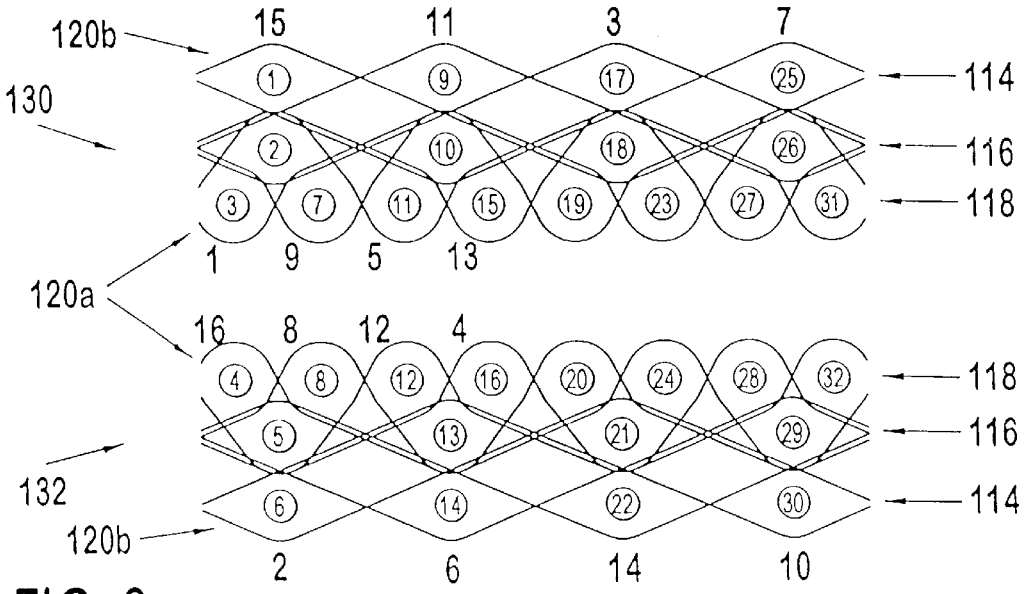
FIG. 8 is a cross section taken along the line 8–8 in FIG. 6.

The CMD yarns 120 interweave with all three MD yarn layers 114, 116 and 118. As shown in FIGS. 5 and 8, the CMD yarns 120 preferably include two CMD subsystems 120*a, b*. Upper CMD subsystem yarns 120*a* weave exclusively with the middle and upper MD layers 116 and 118 and the lower CMD subsystem yarns 120*b* weave exclusively with lower and middle MD layers 114 and 116.

The base fabric 110 has a weave which preferably repeats on sixteen (16) CMD yarns and thirty-two (32) MD yarns. As shown in FIG. 8, CMD yarns 1, 4, 5, 8, 12, 13 and 16 make up the upper CMD subsystem 120*a* and CMD yarns 2, 3, 6, 7, 10, 11, 14 and 15 make up the lower CMD yarn subsystem 120*b*. The upper CMD subsystem yarns 120*a* weave exclusively with the intermediate and upper layer MD yarns 116 and 118. Each upper subsystem CMD yarn 120*a* preferably weaves, relative to the intermediate and upper MD layers 116, 118, over two, under four, over two and under four in a given repeat. For example, as shown in FIG. 8, warp yarn 16 weaves over MD yarns 4 and 5, under MD yarns 8, 12, 13 and 16, over MD yarns 20 and 21, and under MD yarns 24, 28, 29 and 32. The lower CMD subsystem yarns 120*b* preferably weave in a standard "N" pattern relative to the lower and intermediate MD layers 114, 116. For example, CMD yarn 14 weaves over weft yarns 5 and 6, between MD yarns 13 and 14, under MD yarns 21 and 22, and between MD yarns 29 and 30 in a given repeat.

As can be seen in FIG. 8, the intermediate MD yarns 116 interweave with both CMD subsystem layers 120*a,b,* to integrate the fabric. This weave pattern integrates the three MD layers 114, 116, 118 while maintaining the seam loops 122 in substantial vertical alignment. Loop alignment is maintained by the balanced weave of the end upper CMD yarn 120*a* which counterbalances the unbalanced crimp force of the end lower CMD yarn 120*b*.

Figure 9:
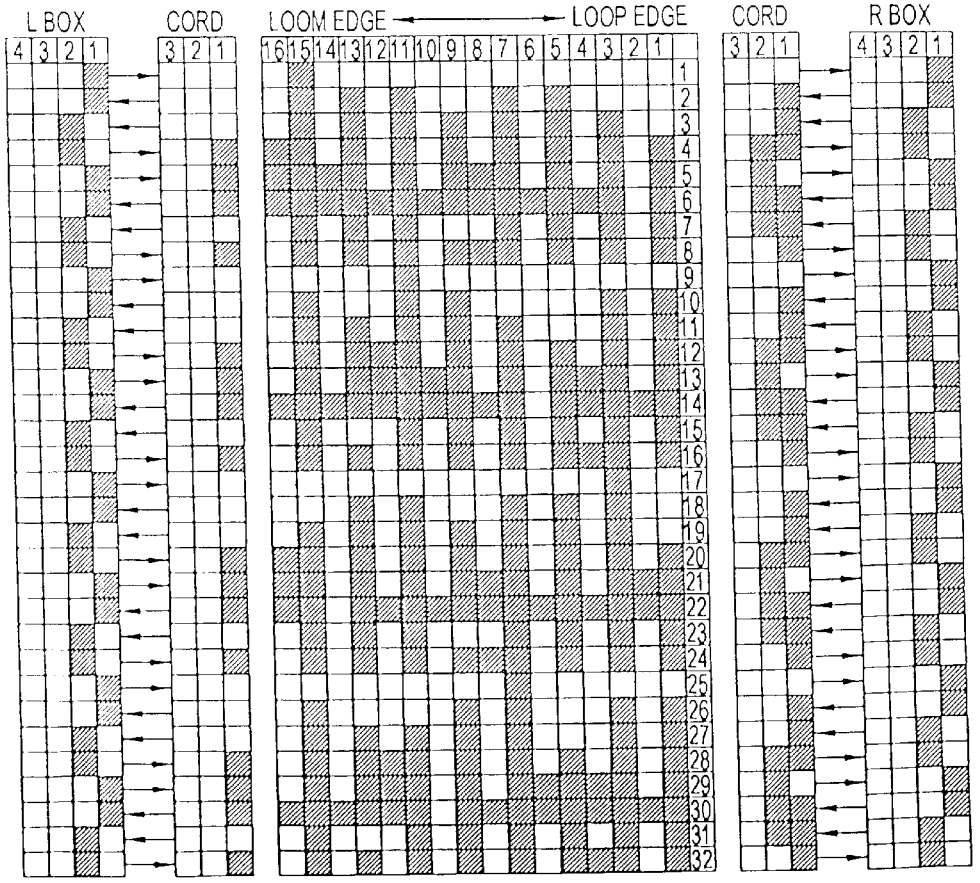
FIG. 9 is a weave pattern diagram for the preferred embodiment of the base fabric of the present invention.

The fabric 110 may be flat woven or endless woven. The preferred method of endless weaving the fabric 110 will be described with reference to FIGS. 6–9. FIG. 9 shows a weave pattern diagram for the base fabric 110 wherein the filled boxes indicate where a warp yarn or cord is over a respective weft yarn. Weaving of the fabric will be described with reference to positioning of the cords only, but it will be understood that the warp heddles are positioned for each shuttle pass in accordance with the desired weave pattern.

The base fabric 110 is preferably woven using a two shuttle loom. Referring to FIGS. 6–9, the first shuttle is thrown across the loom with all of the cords LC, RC1, and RC2 lowered. The right cord RC1 is then raised and the first shuttle is thrown back across the loom, thereby looping around the end right cord RC1. This first shuttle pass is depicted as 1 and 2 in FIG. 6. The end right cord RC1 remains raised and the second shuttle is thrown across the loom from the side opposite the first shuttle. The three left cords LC, RC1, and RC2 are raised as the second shuttle is thrown back across the loom. This second shuttle pass is depicted as 3 and 4 in FIG. 6. The first shuttle then weaves weft yarns 5 and 6. The left cord LC and the inner right cord RC2 are raised and the first shuttle is thrown across the loom. All three cords LC, RC1, and RC2 are raised and the first shuttle is thrown back across the loom, thereby weaving weft yarns 5 and 6 in the lower fabric layer and looping around the end right cord RC1. To weave weft yarn 7, both right cords RC1 and RC2 are raised and the second shuttle is thrown across the loom. The left cord LC and the end right cord RC1 are raised and the second shuttle is thrown back across the loom to weave weft yarn 8. At the transition of each shuttle back to the upper weaving layer 130, a turning fold is formed as is known in endless weaving. The shuttles weave in the same pattern across the width of the fabric 110 with the heddles being adjusted to provide the desired weave pattern.

To open the fabric 110 after the desired width is formed, the right end cord RC1 is removed and the left and inner right cords LC and RC2 are replaced with yarns consistent with the remainder of the warp yarns. Removal of RC1 provides the loops 122 at both ends of the fabric. As can be seen in FIG. 6, in the preferred weaving arrangement, the upper weft yarn passes 3, 4 and 7, 8 will be joined at the loop end of the woven fabric 110 as represented at 150. To facilitate opening of the fabric 110, these weft yarns are cut at 150. It will be understood that various other weaving patterns can be used which will leave these ends separate, thereby eliminating the need for cutting of the upper weft layer yarns.

As can be seen in FIG. 9, the upper layer MD yarns 118 substantially increase the number of entanglement points on the upper surface of the base fabric 110. The increase in entanglement points allows greater adherence of the batt material 112 to the base fabric 110.

What is claimed is:

1. An improved papermaker's fabric of a type having a system of primary machine direction (MD) yarns which form seaming loops at each end of the fabric, the improvement characterized by:

a system of secondary MD yarns that at least equal in number the number of primary MD yarns; and a system of cross-machine direction yarns (CMD) interwoven with the primary and secondary systems of MD yarns in a weave pattern that provides adjacent balancing yarns that maintain the seam loops in substantially vertical alignment.

2. The fabric according to claim 1 wherein the primary MD yarn system includes stacked lower and middle layer MD yarns and the secondary MD yarn system includes a single layer of upper MD yarns.

3. The fabric according to claim 2 wherein the CMD yarn system includes two sub-systems, the first CMD sub-system yarns weaving exclusively with the upper and middle layer MD yarns and the second CMD sub-system yarns weaving exclusively with the middle and lower layer MD yarns.

4. The fabric according to claim 3 wherein each first CMD sub-system yarn weaves in a repeat pattern of over two, under four, over two and under four relative to the upper and middle layer MD yarns.

5. The fabric according to claim 3 wherein each second CMD sub-system yarn weaves in a repeat pattern of over, between, under, between relative to the stacked pairs of middle and lower layer MD yarns.

6. The fabric according to claim 1 wherein the fabric repeats on sixteen CMD yarns.

7. The fabric according to claim 1 wherein the fabric repeats on thirty-two MD yarns.

8. The fabric of claim 1 wherein the fabric is flat woven.

9. The fabric of claim 1 wherein the fabric is endless woven.

10. The fabric of claim 9 wherein the fabric is woven using a two shuttle loom.

11. The fabric of claim 1 wherein batt material is attached thereto.

12. The fabric according to claim 3 wherein the first CMD sub-system yarns weave in repeat pattern of over one, under one with respect to the middle layer MD yarns.

* * * * *